United States Patent
Mun et al.

(10) Patent No.: US 9,120,351 B2
(45) Date of Patent: Sep. 1, 2015

(54) AIRLESS TIRE

(75) Inventors: Dal Yong Mun, Daejeon (KR); Hak Joo Kim, Daejeon (KR); Seok Ju Choi, Daejeon (KR)

(73) Assignee: Hankook Tire Co., Ltd., Seoul (KR)

( * ) Notice: Subject to any disclaimer, the term of this patent is extended or adjusted under 35 U.S.C. 154(b) by 644 days.

(21) Appl. No.: 13/228,379

(22) Filed: Sep. 8, 2011

(65) Prior Publication Data

US 2012/0060991 A1 Mar. 15, 2012

(30) Foreign Application Priority Data

Sep. 14, 2010 (KR) ........................ 10-2010-0090015

(51) Int. Cl.
*B60C 7/10* (2006.01)
*B60C 7/18* (2006.01)

(52) U.S. Cl.
CPC ... *B60C 7/10* (2013.01); *B60C 7/18* (2013.01); *B60C 2007/107* (2013.01)

(58) Field of Classification Search
CPC .............. B60C 7/10; B60C 7/12; B60C 7/18; B60C 2007/107
USPC ......... 152/1, 5, 11, 12, 17, 20, 41, 42, 43, 60, 152/80, 246, 270, 275, 323, 324, 325, 326, 152/327, 328, 329
See application file for complete search history.

(56) References Cited

U.S. PATENT DOCUMENTS

| | | | |
|---|---|---|---|
| 5,042,544 A * | 8/1991 | Dehasse | 152/302 |
| 5,494,090 A | 2/1996 | Kejha | |
| 7,143,797 B2 | 12/2006 | Vannan | |
| 7,650,919 B2 * | 1/2010 | Rhyne et al. | 152/246 |
| 8,109,308 B2 | 2/2012 | Manesh et al. | |
| 8,176,957 B2 * | 5/2012 | Manesh et al. | 152/326 |
| 2005/0042544 A1 | 2/2005 | Oomori et al. | |
| 2011/0240190 A1 * | 10/2011 | Summers et al. | 152/151 |

FOREIGN PATENT DOCUMENTS

| | | |
|---|---|---|
| JP | H07205608 A | 8/1995 |
| JP | 2008044445 A | 2/2008 |
| JP | 2010522666 A | 7/2010 |
| JP | 4857706 B2 | 1/2012 |
| KR | 10-1990-0015355 | 9/1990 |
| WO | WO 2007/057975 A1 | 5/2007 |
| WO | WO 2008/118983 A1 | 10/2008 |

* cited by examiner

*Primary Examiner* — Kip T Kotter
*Assistant Examiner* — Jean Charleston
(74) *Attorney, Agent, or Firm* — Blakely, Sokoloff, Taylor & Zafman LLP

(57) ABSTRACT

Disclosed herein is an airless are which absorbs shock and holds pressure applied to the tire through an auxetic spoke buffer without using air pressure. The airless tire includes a cylindrical tread being in contact with the ground, an axle fixing section having a smaller circumference than the tread and disposed inside the tread, and an auxetic spoke buffer connecting the tread and the axle fixing section and providing a buffering function. Accordingly, the airless tire is transformed only to an extent to properly function as a fire when the spoke buffer is transformed by pressure or impact and fully returns to an original shape when pressure or impact is removed.

10 Claims, 12 Drawing Sheets

(A)

(B)

AIRLESS TIRE

BACKGROUND OF THE INVENTION

1. Field of the Invention

The present invention relates to an airless tire which absorbs shock and holds pressure applied to the tire through an auxetic spoke buffer without using air pressure.

2. Description of the Related Art

While a vehicle is running, tires receive substantial pressure due to the weight of the vehicle, passengers, freight, and the like. Thus, tires are formed to endure such pressure, to provide a buffering function by absorbing shock which can be applied from the road to the vehicle, and to maintain a proper shape so as not to cause any problem when driving the vehicle under such pressure and impact.

Tires having such structure are applied to most vehicles, such as automobiles, bicycles, rickshaws, tractors, and the like.

In order to endure exerted pressure and provide a buffering function while maintaining a proper shape, pneumatic tires filled with air are mostly used.

Such pneumatic tires have substantially different operations and effects depending on the pressure of air in the tires, and cannot maintain a proper shape when the tires have a puncture, thereby causing difficulties in vehicle driving and reduction in lifetime of the tires.

In particular, the most serious problem of air-filled tires is a puncturing phenomenon that a hole is punched in an air filled space of a pneumatic tire and causes the air filled space not to properly work. The puncturing phenomenon occurs during drive of a vehicle and causes a traffic accident.

In order to solve the problems of air-filled tires, an airless tire is under development and various forms of conventional airless tires have been suggested.

Initially, airless tires could be used under conditions in which the tires receive small load as in the case of bicycles, and were produced by molding rubbers or synthetic resins having excellent durability and restoring force into a tire shape.

With remarkable advances in airless tire technology, an airless tire which can be used for a vehicle is developed. Most airless tires to be used for a vehicle have a honeycomb-shaped spoke buffer 300 (see FIG. 1), as disclosed in U.S. Pat. No. 5,494,090, U.S. Pat. No. 7,143,797, Korean Patent Application No. 10-1990-0015355, and PCT/US2008/058308 (WO/2008/118983).

That is, an airless tire is a non-pneumatic airless tire which has a cylindrical tread to be brought into contact with the ground, an axle fixing section having a smaller circumference than the tread and disposed inside the tread, and a honeycomb-shaped spoke buffer connecting the tread and the axle fixing section and providing a buffering function.

However, a conventional airless tire having the honeycomb-shaped spoke buffer 300, as shown in FIG. 1, can be excessively transformed into a shape having difficulty properly performing essential functions of the tire, for example, a shape having an excessively widened ground contacting surface, when the spoke buffer 300 is transformed (generally into an irregular shape) by pressure or impact. Further, the spoke buffer does not rapidly return to an original shape when pressure is removed.

Further, since the spoke buffer 300 has a short lifespan for functioning properly, the airless tire also has a short lifespan.

SUMMARY OF THE INVENTION

The present invention is directed to solving the problems of the related art as described above, and an object of the present invention is to provide an airless tire including an auxetic spoke buffer which is transformed only to an extent to properly function as a tire when pressure or impact is exerted to the tire, fully returns to an original shape when pressure or impact is removed, and can thoroughly perform essential functions for a long period of time.

In accordance with one aspect of the present invention, an airless tire includes a tread, an axle fixing section, and an auxetic spoke buffer, wherein the spoke buffer has an auxetic structure by radial walls and connecting walls, wherein the radial walls extend from the tread to the axle fixing section, include a plurality of protrusions, and are arranged radially, and wherein the connecting walls are disposed between the radial walls to connect the radial walls while connecting portions of the protrusions formed on the radial walls to face opposite sides.

Accordingly, the airless tire is transformed only to an extent to properly function as a tire when pressure or impact is exerted thereto, fully returns to an original shape when pressure or impact is removed, and thoroughly performs essential functions for a long period of time.

Thus, the airless tire according to the present invention includes a cylindrical tread to be in contact with the ground.

Further, the airless tire includes an axle fixing section having a smaller circumference than the tread and disposed inside the tread.

In addition, the airless tire has an auxetic spoke buffer connecting the tread and the axle fixing section and providing a buffering function.

The spoke buffer includes a plurality of radial walls extending from the tread to the axle fixing section, including a plurality of protrusions, and arranged radially; and a plurality of connecting walls disposed between the radial walls to connect the radial walls. Here, the connecting walls connect portions of the protrusions formed on the radial walls to face opposite sides. The spoke buffer has an auxetic structure including a plurality of spaces formed by the radial walls and the connecting walls, and connects the tread and the axle fixing section.

BRIEF DESCRIPTION OF THE DRAWINGS

The above and other aspects, features and advantages of the present invention will be more clearly understood from the following detailed description of exemplary embodiments taken in conjunction with the accompanying drawings:

FIGS. 5A to 5C are schematic views illustrating actions of radial walls and connecting walls according to the present invention, in which FIG. 5A shows a state of the radial walls and the connecting walls before application of load, FIG. 5B shows a state of the radial walls and the connecting walls transformed due to application of load, and FIG. 5C shows a state of the radial walls and the connecting walls before application of load in a dotted line and a state of the radial walls and the connecting walls transformed by application of load in a solid line;

FIGS. 7A and 7B are schematic views illustrating that a ground contacting surface according to the present invention is changed, in which FIG. 7A illustrates a state before the ground contacting surface is changed, and FIG. 7B illustrates a state after the ground contacting surface is changed;

DESCRIPTION OF THE EMBODIMENTS

Hereinafter, exemplary embodiments of the present invention will be described in detail with reference to the accompanying drawings.

However, these embodiments may be embodied in different forms and should not be construed as limiting the present invention. Rather, these embodiments are provided so that the present disclosure will provide thorough and complete understanding of the invention, and will fully convey the scope of the invention to those skilled in the art.

The present invention relates to an airless tire including a spoke buffer having an auxetic structure, which has a shape of a double-headed drum with a narrow waist in the middle.

Therefore, similar to a conventional tire, the airless tire according to the present invention has a tread 10 which will be brought into contact with the ground.

In addition, the airless tire includes an axle fixing section 20 having a smaller circumference than the tread 10 and disposed as an inner concentric circle of the tread 10.

In addition, the airless tire has an auxetic spoke buffer 30 which connects the tread 10 and the axle fixing section 20 and provides a buffering function.

Such an airless tire including the tread 10, the axle fixing section 20 and the spoke buffer 30 is generally known in the art, and the tread 10, the axle fixing section 20 and the spoke buffer 30 may have various shapes and be modified in various shapes. Thus, detailed descriptions thereof will be omitted for conciseness and clarity.

However, aspects of the present invention provide airless tires which may be transformed only to an extent to properly function as a tire when pressure or impact is exerted, fully return to an original shape when pressure or impact is removed, and thoroughly perform essential functions for a long period of time.

Figure 1:
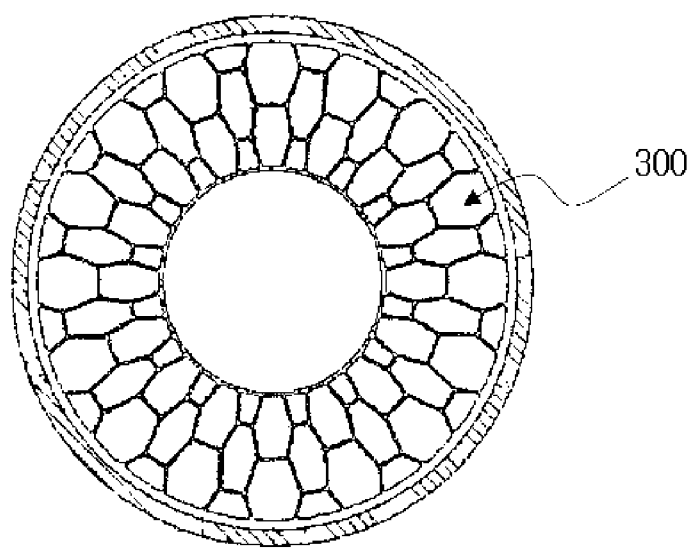
FIG. 1 is a schematic front view of a conventional airless tire having a spoke buffer with a honeycomb structure.

A major cause of problems of the conventional the is that a honeycomb-shaped spoke buffer 300 shown in FIG. 1 does not properly work.

Figure 2:
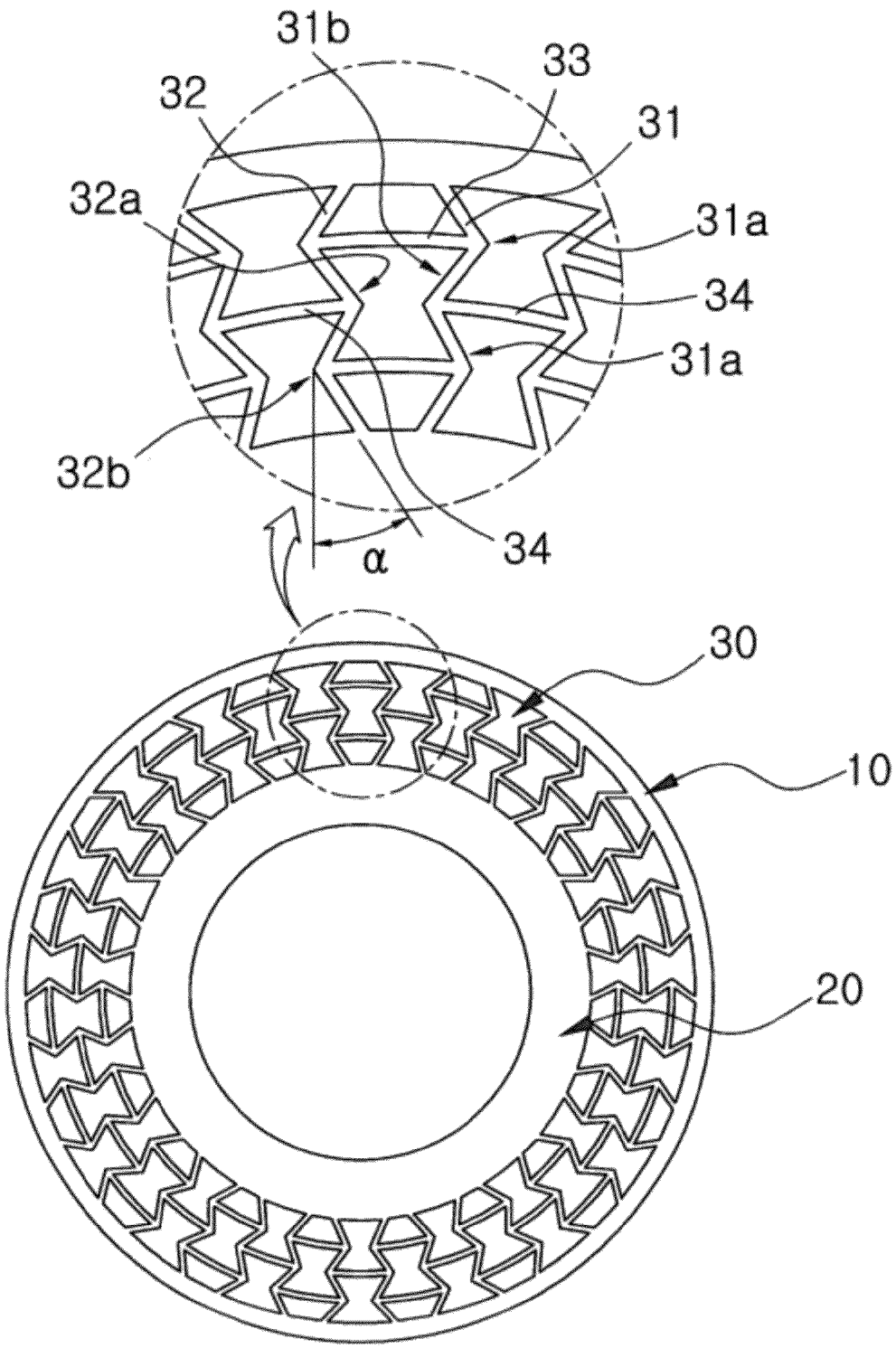
FIG. 2 is a schematic front view of an airless tire according to one exemplary embodiment of the present invention.
Figure 3:
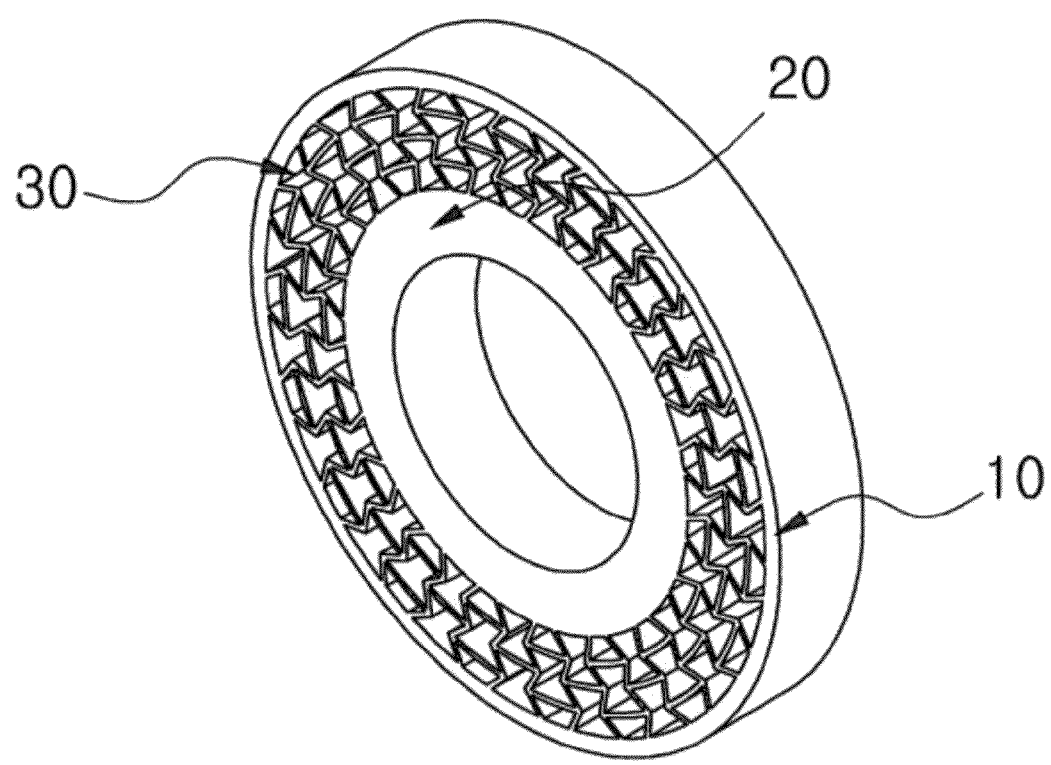
FIG. 3 is a perspective view of the airless tire according to the exemplary embodiment of the present invention.
Figure 4:
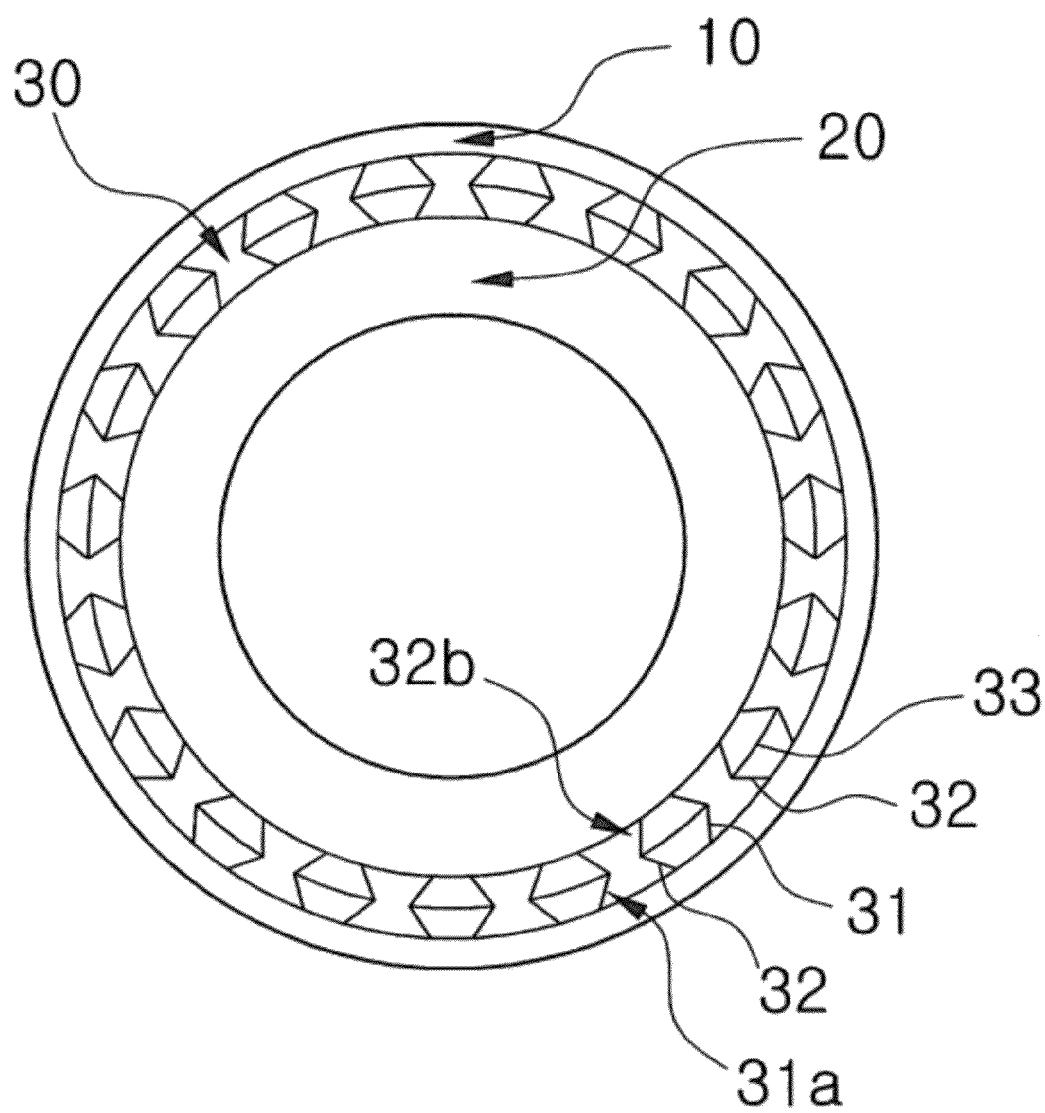
FIG. 4 is a schematic front view of an airless tire according to another exemplary embodiment of the present invention.

The inventor of the present invention has conducted extensive studies and thus devised a spoke buffer 30, as shown in FIGS. 2 to 4. The spoke buffer 30 includes a plurality of radial walls 31, 32 and a plurality of connecting walls 33, 34. The radial walls 31, 32 extend from the tread 10 to the axle fixing section 20, include a plurality of protrusions 31a, 31b, 32a, 32b, and are radially arranged. The connecting walls 33, 34 are disposed between the radial walls 31, 32 to connect the radial walls 31, 32, and connect portions of the protrusions 31a, 31b, 32a, 32b which are formed on the radial walls 31, 32 to face opposite sides.

That is, the inventor of the present invention devised an airless tire including an auxetic spoke buffer 30 having a plurality of spaces formed by the radial walls 31, 32 and the connecting walls 33, 34.

Figure 5:
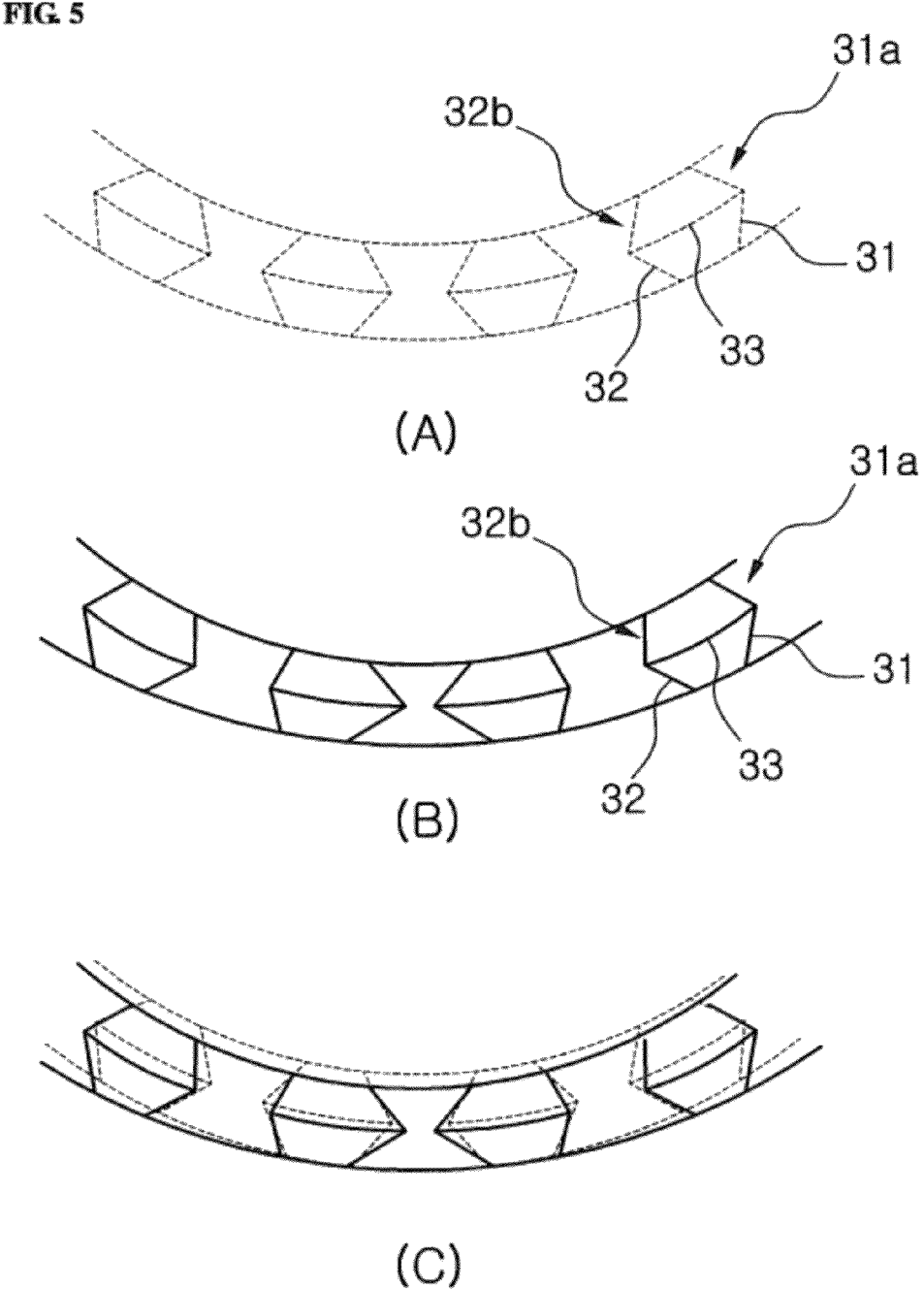

With the above structure, the spoke buffer 30 may be transformed from a state shown in FIG. 5A to a state shown in FIG. 5B upon application of load to the tire.

Figure 6:
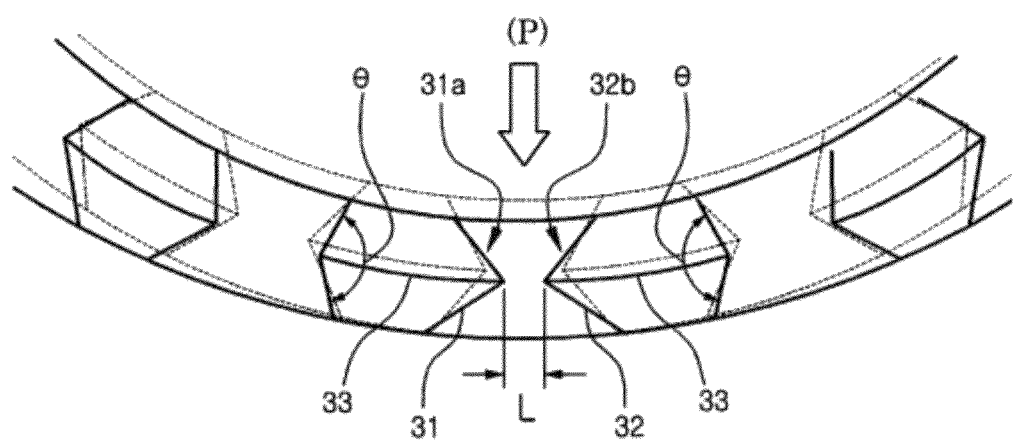
FIG. 6 is a schematic view illustrating actions of the radial walls and the connecting walls, wherein actions before application of load (P) are shown in a dotted line, actions after application of load (P) are shown in a solid line, and movement directions of the connecting walls or radial walls are shown as in arrows.

In detail with reference to FIG. 6, when load P is perpendicularly applied to the tire, the protrusions 31a, 32b of radial walls which are directly affected by the load among many radial walls 31, 32 are compressed, so that a distance L between the protrusions 31a, 32b facing each other is reduced.

Then, the connecting walls 33, 34 each connected at one side thereof to the compressed protrusions 31a, 32b are compressed together to pull the protrusions of other radial walls connected to the connecting walls 33. Here, as shown in FIG. 2, force is transmitted to the radial walls 31 connected with the pulled connecting walls 33 and to other connecting walls 34 connected with these radial walls 31, so that an angle θ forming the protrusions of the other radial walls, other than the protrusions 31a, 32b of the radial walls 31, 32 compressed by the load P, becomes great.

When the load P disappears, the radial walls 31, 32 and the protrusions 31a, 32b return to original states.

Accordingly, the tire is not excessively compressed but properly performs essential functions when load is applied.

Figure 7:
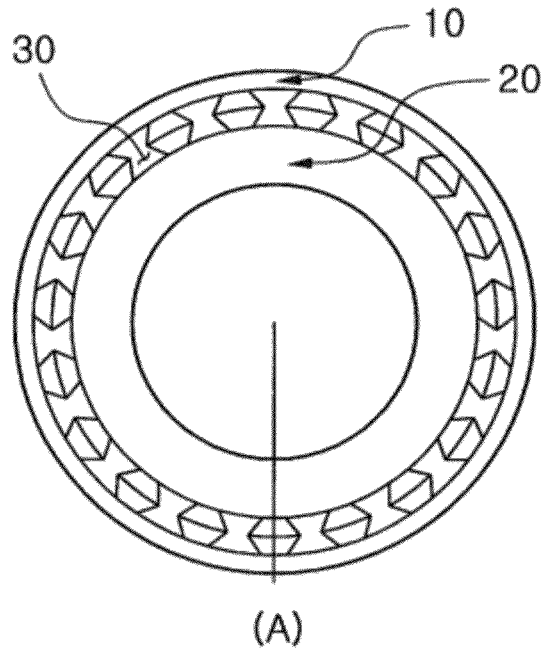
Figure 7:
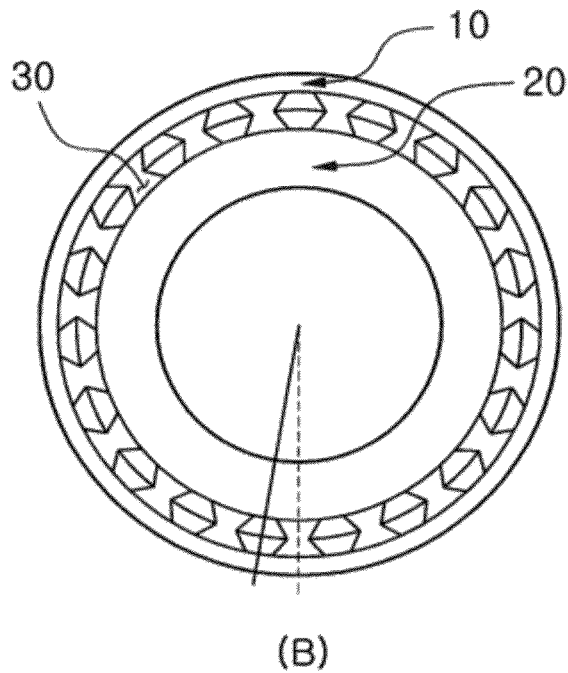

However, in the case where the radial walls 31, 32 include one protrusion 31a, as shown in FIG. 4, when a ground contacting surface is changed from in a state of FIG. 7A to in a state of FIG. 7B, the effects of the present invention are reduced.

Thus, in order to allow the spoke buffer 30 to be transformed within an appropriate level and to properly return to the original state, the radial walls 31, 32 may have a plurality of protrusions 31b, 32b projecting to a left side or a plurality of protrusions 31a, 32a projecting to a right side, as shown in FIGS. 2 and 3.

Further, portions of the protrusions 31a, 31b, 32a, 32b formed on the radial walls 31, 32 to face opposite sides may be connected to each other by the connecting walls 33, 34.

In FIG. 2, protrusions 31a, 31b, 32a, 32b formed on the radial walls 31, 32 and facing opposite sides are connected by the connecting walls 33, 34.

In order to allow the spoke buffer 30 to be transformed within an appropriate level and to properly return to the original state, the connecting walls 33, 34 may connect the highest points (the most projecting parts) of the protrusions 31a, 31b, 32a, 32b.

Further, the plurality of connecting walls 33, 34 may be arranged in a circular shape (as shown in FIG. 2).

Since a wheel has an overall cylindrical shape, the connecting walls 33, 34 are required to be arranged in a circular shape for excellent effects.

Considering the objects of the present invention, the protrusions 31a, 31b, 32a, 32b of the radial walls 31, 32 may have a "<" or ">" shape as shown in FIG. 2.

In addition, as a result of experimental studies, an angle α between a vertical line and an extension line for forming the protrusions 31a, 31b, 32a, 32b of the radial walls 31, 32 may be in the range of 15 to 53 degrees.

When the angle is 15 degrees or less, it is difficult to form vertical stiffness similar to that of a pneumatic tire. When the angle is 53 degrees or greater, a distance L between one protrusion and a neighboring protrusion is excessively reduced, causing cause interference.

Figure 10:
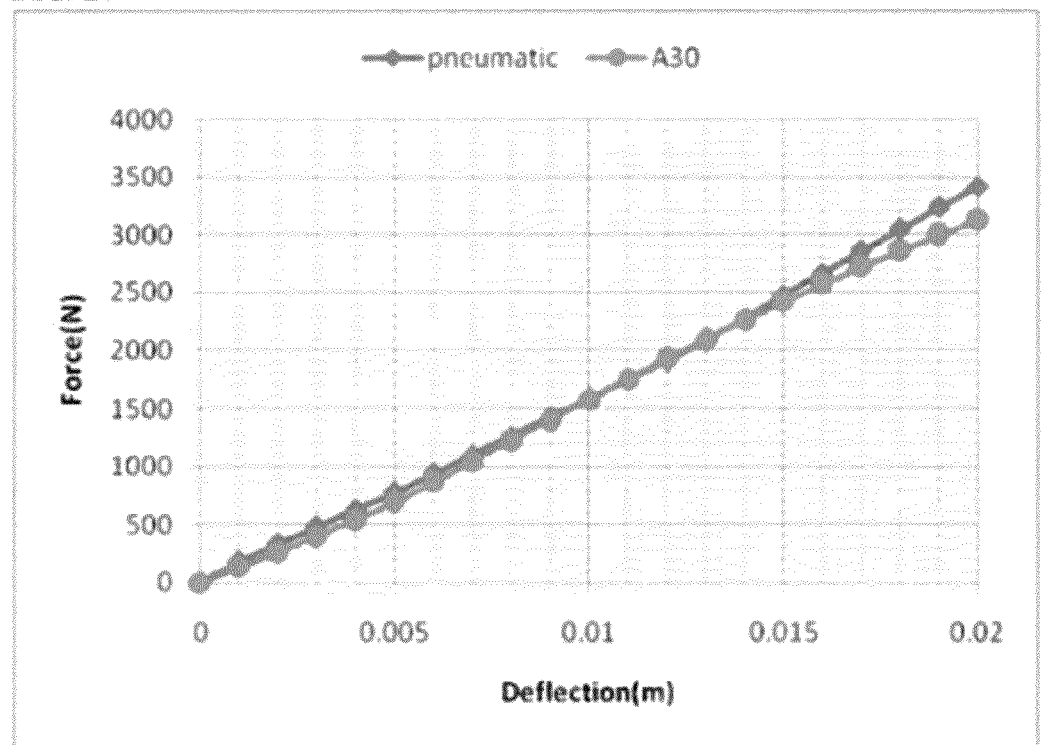
FIG. 10 is a graph illustrating a result of an experiment for investigating a proper range of an angle between a vertical line and an extension line for forming the protrusions of the radial walls when the protrusions have a "<" or ">" shape, wherein the angle is 30°.
Figure 11:
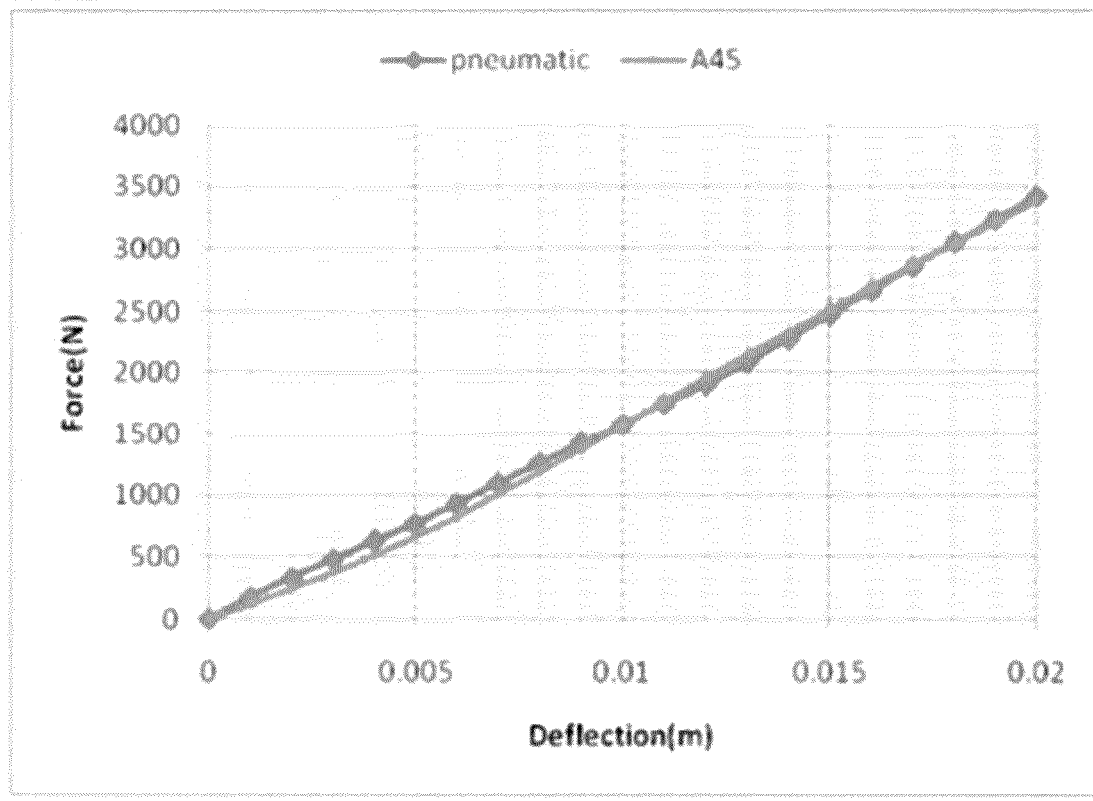
FIG. 11 is a graph illustrating a result of the experiment for investigating a proper range of the angle between the vertical line and the extension line for forming the protrusions of the radial walls when the protrusions have a "<" or ">" shape, wherein the angle is 45°.
Figure 12:
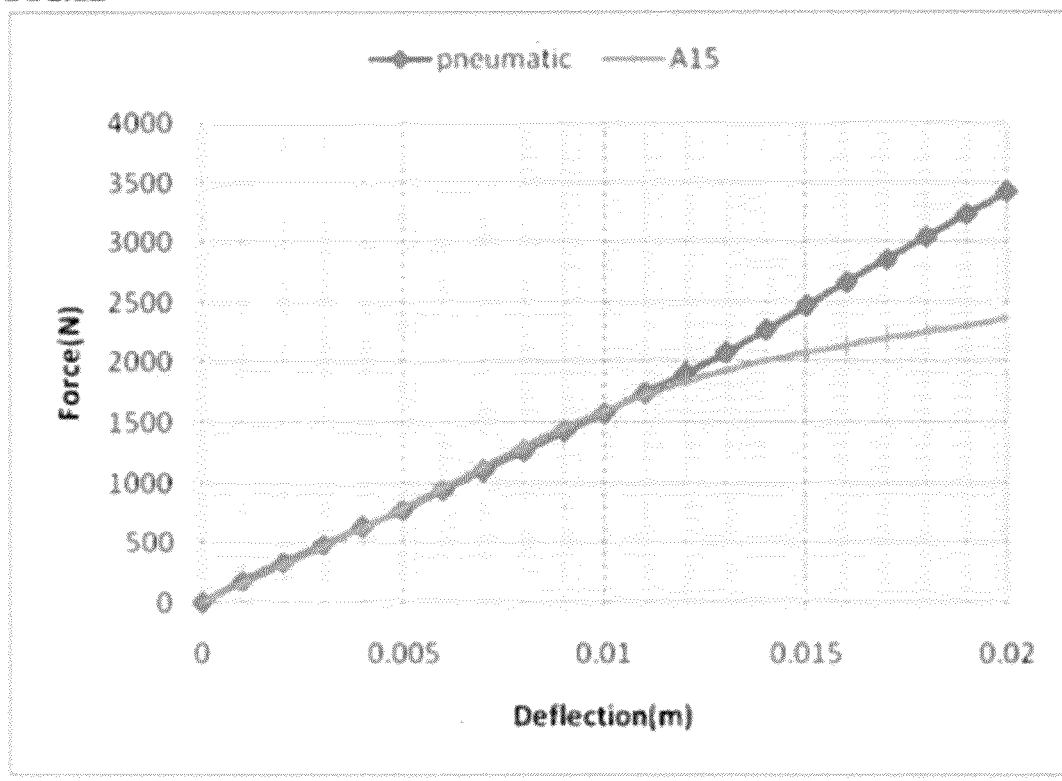
FIG. 12 is a graph illustrating a result of the experiment for investigating a proper range of the angle between the vertical line and the extension line for forming the protrusions of the radial walls when the protrusions have a "<" or ">" shape, wherein the angle is 15°.

As can be seen from FIGS. 10 to 12, it is desirable that the angle α be in the range of 30 to 45 degrees.

FIGS. 10 to 12 are graphs illustrating results of investigating a proper range of the angle α forming the vertical line and the extension line for forming the protrusions 31a, 31b, 32a, 32b of the radial walls 31, 32.

In the graphs of FIGS. 10 to 12, A15, A30 and A45 refer to the angle α.

Further, the term "pneumatic" refers to an experimental result of a pneumatic tire for comparison.

According to the exemplary embodiments of the present invention, the radial walls 31, 32 may include a plurality of protrusions 31a, 31b, 32a, 32b. Here, when the protrusions have a "<" or ">" shape, the plurality of protrusions may be formed in a shape as shown in FIGS. 8 and 9.

In the exemplary embodiments of the present invention, as the spoke buffer 30 has a greater height (a distance from the tread 10 to the axle fixing section 20), the tire has excellent buffering effects. However, if the radial walls 31, 32 have too many protrusions 31a, 31b, 32a, 32b in order to improve the buffering effect, there are problems in that the buffering effect is reduced and the tire does not properly return to the original state after application of pressure.

The inventor of the present invention reached a conclusion that the radial walls 31, 32 desirably include about two protrusions 31a, 31b, 32a, 32b.

Figure 8:
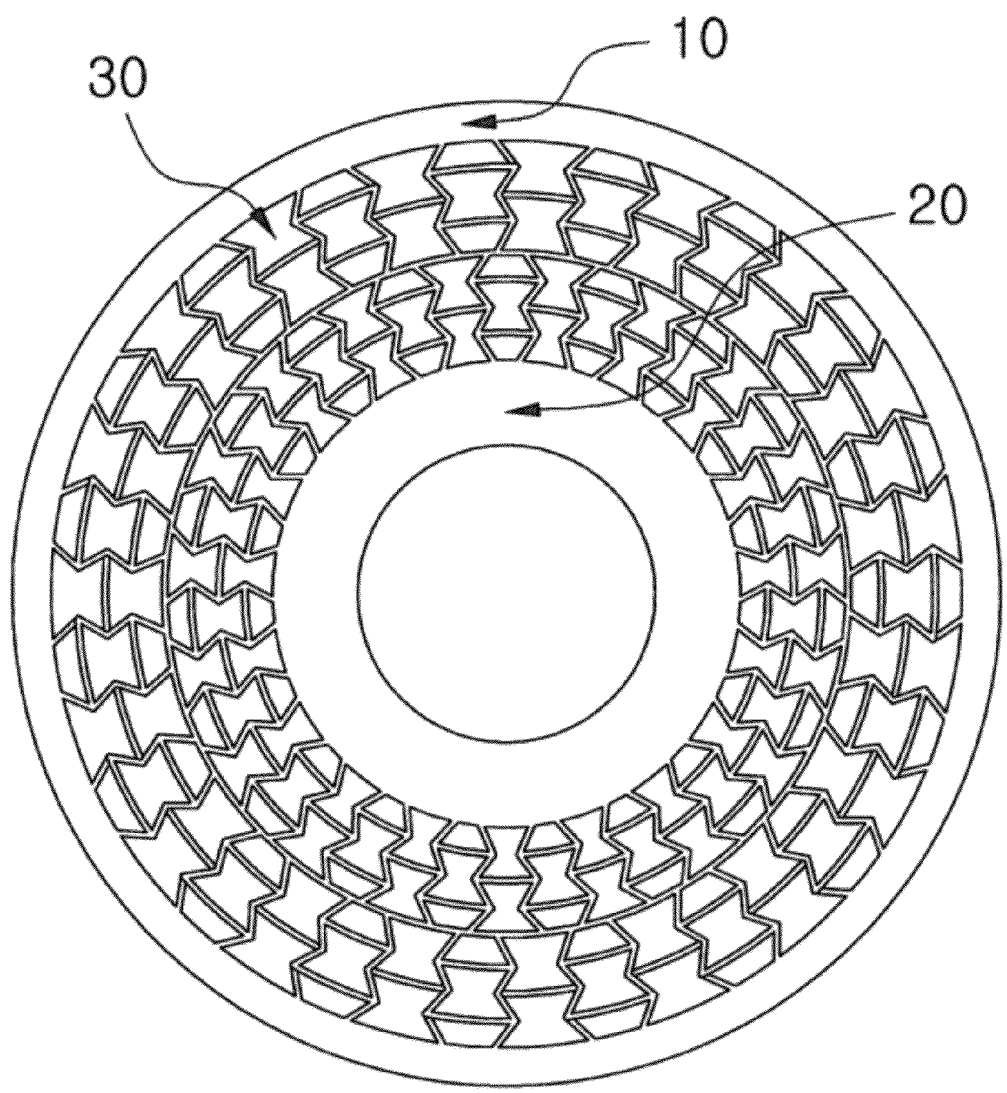
FIG. 8 is a schematic front view illustrating a structure in which the radial walls form steps such that radial walls in the respective steps form staggered arrangement.
Figure 9:
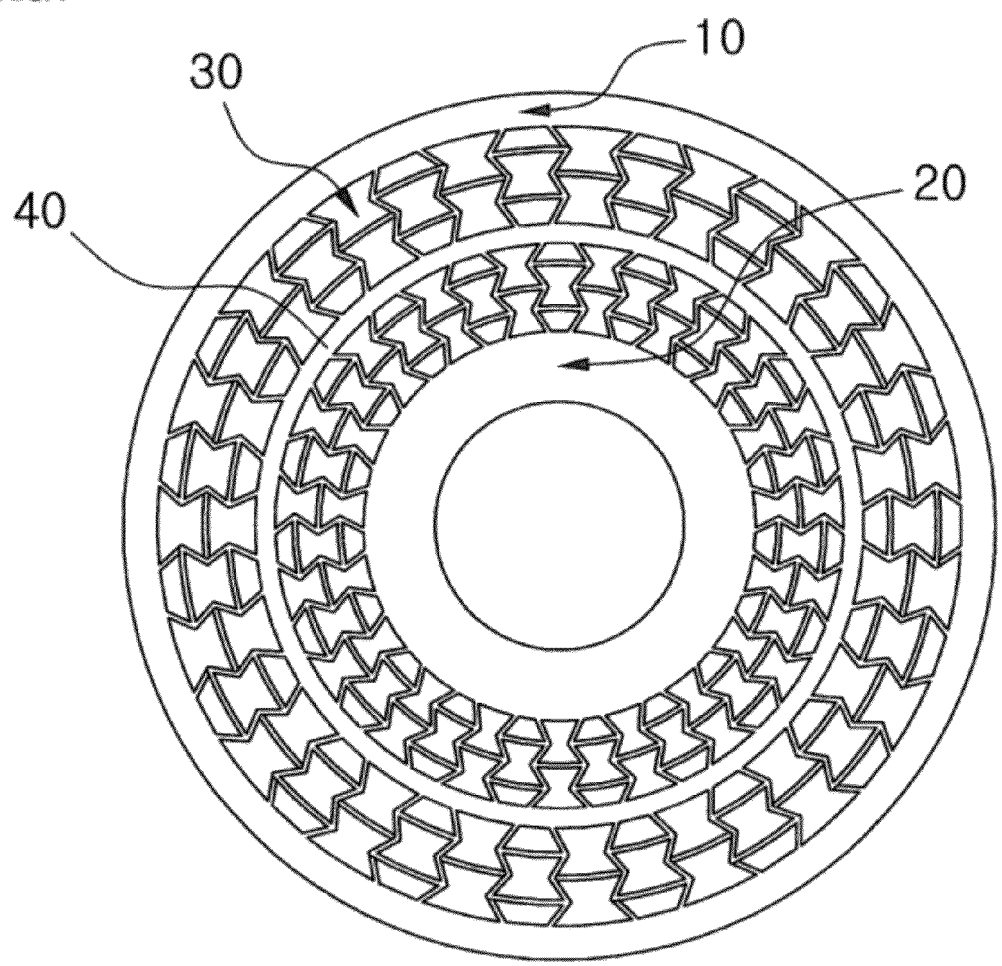
FIG. 9 is a schematic front view illustrating that the radial walls form steps and a step defining connecting body is disposed between the steps of the radial walls.

In order to increase the height of the spoke buffer 30 while securing proper effects of the present invention, the radial walls 31, 32 of the spoke buffer 30 may be disposed to form steps, as shown in FIGS. 8 and 9.

That is, as shown in FIG. 8, a plurality of radial walls 31, 32 is formed to constitute steps from the tread 10 to the axle fixing section 20, such that the radial walls in the respective steps form staggered arrangement.

Alternatively, as shown in FIG. 9, a plurality of radial walls 31, 32 is formed to constitute steps from the tread 10 to the axle fixing section 20, and a cylindrical step defining connecting body 40 having a smaller circumference than the tread 10 is disposed between the steps of the radial walls 31, 32.

As a result of extensive studies, the inventor of the present invention reached a conclusion that the radial walls constituting the spoke buffer 30 are desirably divided into a first radial wall 31 and a second radial wall 32, as shown in FIG. 2.

In FIG. 2, the first radial wall 31 includes a plurality of right protrusions 31a projecting to the right side and a left protrusion 31b projecting to the left side between the right protrusions 31a.

Further, the second radial wall 32 includes a plurality of left protrusions 32b projecting to the left side and a right protrusion 32a projecting to the right side between the left protrusions 32b.

In addition, the first radial walls 31 and the second radial walls 32 are alternately and radially arranged.

In this configuration, there is also drawn a conclusion that the connecting walls are desirably divided into a first connecting wall 33 and a second connecting wall 34, as shown in FIG. 2, wherein the first connecting wall 33 connects the right protrusions 31a of the first radial wall 31 and the left protrusions 32b of the second radial wall 32, and the second connecting wall 34 connects the left protrusion 31b of the first radial wall 31 and the right protrusion 32a of the second radial wall 32.

That is, the first connecting wall 33 connects the right protrusions 31a of the first radial wall 31 and the left protrusions 32b of the second radial wall 32, the right protrusions 31a and the left protrusions 32 facing opposite sides, respectively.

The second connecting wall 34 connects the left protrusion 31b of the first radial wall 31 and the right protrusion 32a of the second radial wall 32, the left protrusion 31b and the right protrusion 32a facing opposite sides, respectively.

As such, according to the exemplary embodiment of the invention, the airless tire includes the tread, the axle fixing section, and the auxetic spoke buffer, wherein the spoke buffer has an auxetic structure by the radial walls and the connecting walls, wherein the radial walls extend from the tread to the axle fixing section, include a plurality of protrusions, and are arranged radially, and wherein the connecting walls are disposed between the radial walls to connect the radial walls and connect portions of the protrusions formed on the radial walls to face opposite sides.

Accordingly, the airless fire is transformed only to an extent to properly function as a tire when the spoke buffer or the like is transformed by pressure or impact, fully returns to an original shape when pressure or impact is removed, and thoroughly performs essential functions for a long period of time.

When the radial walls include a plurality of protrusions projecting to the left side or a plurality of protrusions projecting to the right side, the airless tire is transformed within an appropriate level and properly returns to the original state.

Further, when the connecting walls connect the highest points of the protrusions, the airless tire is transformed within an appropriate level and properly returns to the original state.

In addition, when the plurality of connecting walls are arranged in a circular shape, the airless tire is transformed within an appropriate level and properly returns to the original state.

In the present invention, when a plurality of radial walls is formed to constitute steps from the tread to the axle fixing section and the radial walls in the respective steps form the staggered arrangement, the spoke buffer may properly function while increasing the height of the spoke buffer.

Moreover, when a plurality of radial walls is formed to constitute steps in the direction from the tread to the axle fixing section and a cylindrical step defining connecting body having a smaller circumference than the tread is disposed between the steps of the radial walls, the spoke buffer may properly function while increasing the height of the spoke buffer.

It should be understood that the embodiments and the accompanying drawings have been described for illustrative purposes, and the present invention is limited only by the following claims. Further, those skilled in the art will appre-

What is claimed is:

1. An airless tire including a cylindrical tread in contact with a ground, an axle fixing section having a smaller circumference than a circumference of the tread and disposed as an inside concentric circle of the tread, and a spoke buffer connecting the tread and the axle fixing section and providing a buffering function, wherein the spoke buffer comprises a plurality of radial walls extending from the tread to the axle fixing section, including a plurality of protrusions and radially arranged; and a plurality of connecting walls disposed between the radial walls to connect the radial walls, the connecting walls connecting portions of the protrusions formed on the radial walls to face opposite sides, the spoke buffer having an auxetic structure including a plurality of spaces formed by the radial walls and the connecting walls and connecting the tread and the axle fixing section, and wherein the connecting walls are aligned to be parallel to the circumferences of the cylindrical tread and the axle fixing section.

2. The airless tire according to claim 1, wherein the radial walls comprise a plurality of protrusions projecting to a left side and a plurality of protrusions projecting to a right side, and wherein the plurality of protrusions projecting to the left side are projected to face opposite sides of the plurality of protrusions projecting to the right side.

3. The airless tire according to claim 1, wherein the connecting walls connect highest points of the protrusions.

4. The airless tire according to claim 1, wherein the plurality of connecting walls are arranged in a circular shape.

5. The airless tire according to claim 1, wherein a plurality of radial walls are formed to constitute steps from the tread to the axle fixing section, and the radial walls in the respective steps form staggered arrangement.

6. The airless tire according to claim 5, wherein a plurality of radial walls are formed to constitute steps from the tread to the axle fixing section, and a cylindrical step defining a connecting body having a smaller circumference than the tread disposed between the steps of the radial walls.

7. The airless tire according to claim 1, wherein the protrusions of the radial walls have a "<" or ">" shape.

8. The airless tire according to claim 7, wherein an angle between a vertical line and an extension line for forming the protrusions of the radial walls is in the range of 15 to 53 degrees.

9. The airless tire of claim 1, wherein the radial walls are divided into a first radial wall and a second radial wall, the first radial wall comprising a first plurality of right protrusions and a second plurality of left protrusions, the second radial wall comprising a second plurality of left protrusions and a second plurality of right protrusions, the first radial walls and the second radial walls being alternately and radially arranged.

10. The airless tire according to claim 1, wherein the connecting walls are divided into a first connecting wall and a second connecting wall, the first connecting wall connecting a plurality of right protrusions of a first radial wall and a plurality of left protrusions of a second radial wall, the second connecting wall connecting a plurality of left protrusions of the first radial wall and a plurality of right protrusions of the second radial wall.

* * * * *